CONTROL OR SIGNALING SYSTEM

Filed Oct. 7, 1947

INVENTOR
FERNAND PIERRE GOHOREL
BY Robert Harding Jr.
ATTORNEY

Patented June 27, 1950

2,512,639

UNITED STATES PATENT OFFICE 2,512,639

CONTROL OR SIGNALING SYSTEM

Fernand Pierre Gohorel, Antony, France, assignor to International Standard Electric Corporation, New York, N. Y., a corporation of Delaware Application October 7, 1947, Serial No. 778,440
In France January 5, 1944

Section 1, Public Law 690, August 8, 1946,
Patent expires January 5, 1964

7 Claims. (Cl. 177—353)

This invention relates to a system which makes it possible to obtain, by simple means, the transmission of various control impulses or signals over a single conductor.

One of the characteristics of the invention is to be found in the fact that, for one of the control impulses or signals, use is made of a direct current with a given direction of flow, whereas the other control impulse or signal is by means of a pulsating direct current in the same direction, said pulsating current being obtained from an alternating current of which the alternations in the sense opposed to that of the direct current are stopped by any suitable means.

Another characteristic of the invention is to be found in the transmission of a certain number of control impulses or signals over a single conductor, by means of direct currents of different directions and intensities; of pulsating direct currents, the respective amplitudes and senses of which are suitably chosen, of alternating currents having both alternations (positive and negative) of identical or opposed direction, and by combining or failing to combine the effects of the elements actuated by these distinct currents.

Yet another characteristic of the invention rests in the fact that transmission of a certain number of control impulses or signals is obtained on a single conductor by the use of direct currents of diverse intensities, the direction of which is periodically reversed, at a sufficiently slow tempo not to cause operation of the elements which are meant to be actuated by the pulsating direct.

The guiding principles of the invention will be brought out by the following descriptions, given here as non-limitative examples, and by consulting the appended illustrations, in which.

Figures 1, 2:
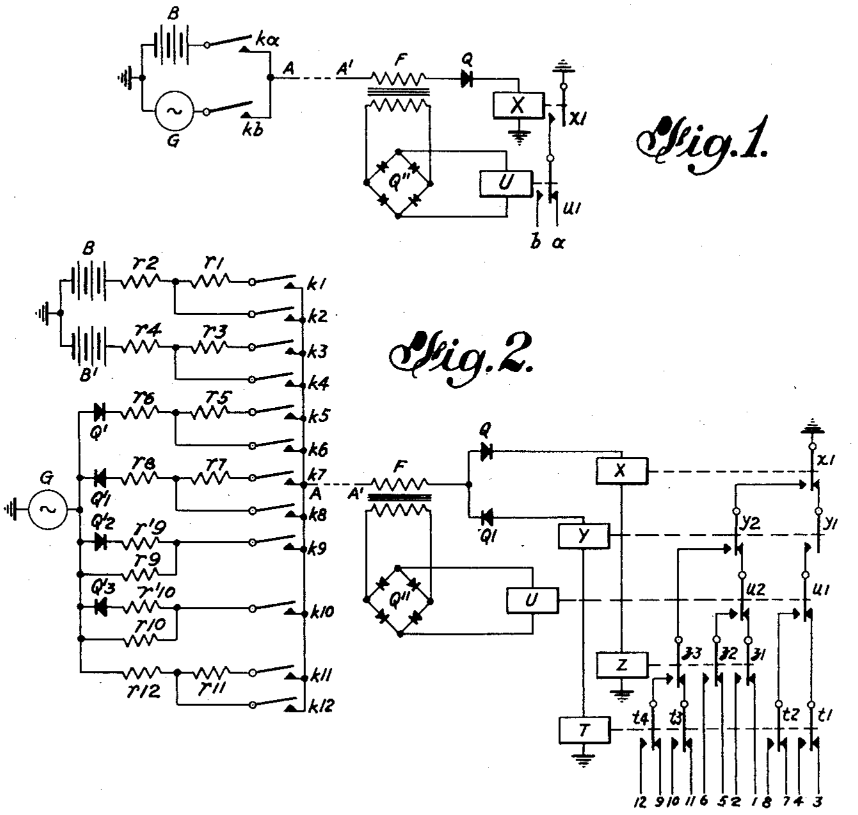
Figure 1 is a device for the transmission of two control impulses or signals over a single wire or conductor.
Figure 2 is a device for the transmission of twelve control impulses or signals over a single wire or conductor.

It will be seen, by having reference to Figure 1, that a relay $x$, a rectifier Q and the primary of a transformer F, the secondary of which is closed on a relay U through a rectifying device Q'', are inserted in series in the control circuit.

If switch $ka$ is closed, the circuit of battery B is completed through winding F, rectifier Q and relay X. Said relay then is operated. On the other hand, this direct current remains completely without effect on relay U. Through its make contact $x_1$ relay X completes the circuit of control or signaling wire $a$.

If switch $kb$ is closed, while $ka$ remains open, a pulsating direct current in the same direction as that coming from battery B will circulate through the circuit. This current will cause the induction, in the secondary of transformer F, of an alternating current which, being rectified in Q'', will actuate relay U. On the other hand, relay X will also be actuated by the pulsating direct current.

The circuit of control or signaling wire $b$ will be completed through make contacts $u_1$ and $x_1$.

In the device of Figure 2, the number of the controls transmitted has been increased by using direct currents having different directions and intensities, pulsating direct currents with alternations of different directions and amplitudes, alternating currents the positive and negative alternations of which are of equal or different amplitudes, and alternating currents.

It will thus be possible, with two different intensities, to obtain twelve different control impulses. Resistors $r1$ to $r12$ are so adjusted as to make the average operating current of relays X, Y, Z and T identical or capable of producing the same magnetic effect, whether the current used be direct, pulsating or alternating.

It will now be supposed that relay X is operated by a current having a lower average value than that which is needed to operate relay Z, while relay Y requires a current having a mean value smaller than that needed to operate relay T. Relay U functions with any pulsating direct current or alternating current transmitted over the circuit.

When switch $k1$ is closed, relay X alone is operated and completes, through make contact $x_1$, the circuit of control wire 1.

When switch $k2$ is closed, relays X and Z are operated and complete, by means of their make contacts $x_1$ and $z_1$, the circuit of control wire 2.

When switch $k3$ is closed, relay Y is operated and completes, through its make contact $y_1$, the circuit of control wire 3.

When switch $k4$ is closed, relays Y and T are operated and complete, by means of their make contacts $y_1$ and $t_1$, the circuit of control wire 4.

When switch $k5$ is closed, relays X and U are operated and complete by means of their make contacts $x_1$ and $u_2$, the circuit of control wire 5.

When switch $k6$ is closed, relays X, Z and U are operated and complete, by means of their make contacts $x_1$, $u_2$ and $z_3$, the circuit of control wire 6.

When switch k7 is closed, relays Y and U are operated and complete, by means of their make contacts $y_1$ and $u_1$, the circuit of control wire 7.

When switch k8 is closed, relays Y, T and U are operated and complete, by means of their make contacts $y_1$, $u_1$ and $t_2$, the circuit of control wire 8.

When switch k9 is closed, relays X, Z, Y and U are operated and the circuit of control wire 9 is completed by means of make contacts $x_1$, $y_2$ and $z_3$. The operation of U has no effect.

When switch k10 is closed, relays Y, T, X and U are operated and the circuit of drive wire or conductor 10 is completed by make contacts $X_1$, $Y_2$ and $t_3$. The operation of U remains without effect.

When switch k11 is closed, relays X, Y and U are operated and the circuit of control wire 11 is completed by make contacts $x_1$, $y_2$. The operation of U remains without effect.

When switch k12 is closed, relays X, Y, Z, T and U are actuated and the circuit of control wire 12 is completed by make contacts $x_1$, $y_2$, $z_3$ and $t_4$. The operation of U remains without effect.

Figure 3:
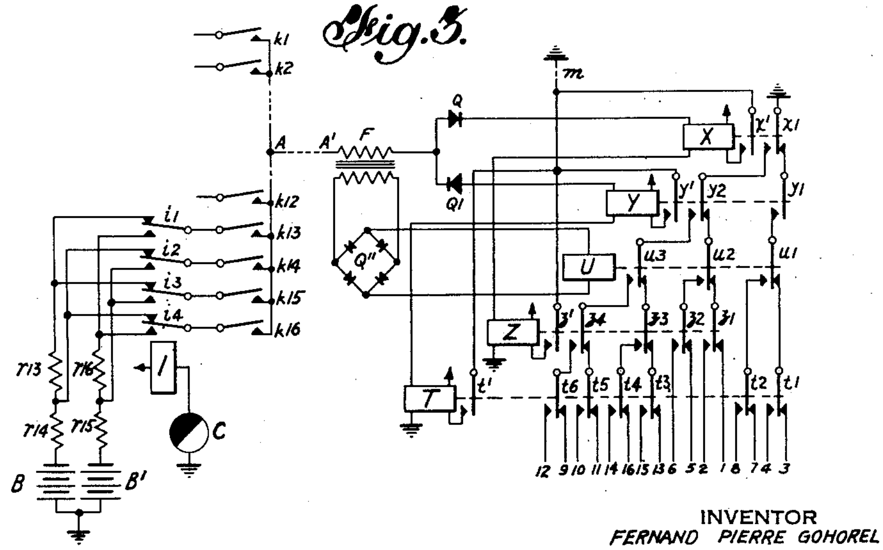
Figure 3 is a device for the transmission of sixteen control impulses or signals over a single wire or conductor.

The device shown on Figure 3 comprises, in addition to the control impulses shown in connection with the device of Figure 2, four additional control impulses achieved by the use of direct currents, the direction of which is periodically reversed at a slow tempo, in order not to induce, in the secondary of transformer F, any currents which might operate relay U.

Relays X, Y, Z and T have been provided with a second or holding winding, the circuit of which can be completed through wire or conductor $m$.

A relay I is inserted in the circuit of a cam C, which periodically closes the circuit of said relay. Contacts $i_1$ to $i_4$ are associated with relay I.

When switch k13 is closed, since relay I is not operated, relay X attracts its armature. At $x_1$, it closes its holding circuit on wire or conductor $m$. When cam C closes the circuit of I, work contact $i_1$, is closed and relay Y is energized and held by its contact $y_1$. The circuit of control wire 13 then is closed through work contacts $x_1$ and $y_2$.

Study of the figure shows that, when one of switches k14, k15 or k16 is closed, the circuit of control wires 14, 15 or 16 also is closed.

In order to avoid, during the time which elapses between the functioning of relay X and that of one of relays Y and T, the temporary and untimely closing of a control wire other than that of the transmitted control, there can be provided any appropriate means for the bias on spring $x_1$ to be placed, after the beginning of the receipt of a control impulse, only after a time interval having a duration greater than the tempo provided by cam C.

When the transmission of the control impulse is finished and the corresponding operation has been carried out, the bias is cut off from the wire $m$ by any appropriate means, in order to cause relays X, Z, Y and T to come back to rest.

The holding winding provided on relays X, Y, Z and T could be eliminated if said relays were made sufficiently slow release so as not to fall off during the circuit opening periods.

It must remain quite clear that it would be possible to modify the combinations indicated or provide different ones, all embodiments involving the use of a relay inductively coupled with the control wire or conductor and capable of operating, for certain controls, under the action of a current causing, on the other hand, the operation of one or several relays, remaining within the scope of this invention.

1. A signalling system comprising sending and receiving stations connected together over a conducting path, sources of direct current and of alternating current, means at said sending station for applying current of either source, a first relay for responding to either direct or rectified alternating current, a unidirectional device, a second relay for responding to alternating current only, a transformer, a rectifier, a circuit at said receiving station including the primary winding of said transformer, said unidirectional device, and said first relay, a circuit at said receiving station including the secondary winding of said transformer, said rectifier, and said second relay, two other circuits at said receiving station including contacts on said first and second relays, and means for closing one of said two other circuits when said first relay responds to direct current applied at said sending station and for closing the other of said two other circuits when both said first and second relays respond to alternating current applied at said sending station.

2. A signalling system comprising a sending station and a receiving station, a single conductor connecting said stations, sources of direct current and of alternating current connected to ground, means at said sending station for applying current from either source to said conductor, an alternating current transformer, a unidirectional device, a first relay for responding to a current flowing in one direction only, an alternating current rectifier, and a second relay for responding to rectified alternating current only, circuit at said receiving station including said transformer, said rectifier, said unidirectional device, and the windings of said first and second relays, other circuits including contacts on said relays at said receiving station, and means for closing a predetermined one of said other circuits depending on the particular type of current applied to said conductor at said sending station.

3. A signalling system comprising a sending station and a receiving station, a conducting path connecting said stations, sources of direct current and of alternating current, means at said sending station for applying current of either source to said conducting path, a first relay, a unidirectional device, said first relay connected in series with said unidirectional device and said conducting path at said receiving station, a transformer, a second relay, a rectifier, said second relay connected to said transformer through said rectifier, said transformer being connected in series with said path at said receiving station, other circuits including the contacts on said relays at said receiving station, and means for closing a predetermined one of said other circuits depending on the type and intensity of current connected to said conducting path at said sending station.

4. A signalling system comprising a sending station and a receiving station, a single conductor connecting said stations, sources of direct current and of alternating current, means at said sending station for connecting either source of current between said conductor and ground, a first relay, a unidirectional current device, said first relay and said device connected in series between said conductor and ground at said receiving station, a second relay, a transformer, an alternating current rectifier, said second relay connected to said transformer through said rectifier, said transformer being connected in series with said line at said receiving station, circuits including the contacts on said relays, and means for closing a predetermined one of said other circuits depending on the source of current connected to said conductor at said sending station.

5. A signalling system comprising a sending and a receiving station, a conducting path connecting said stations, sources of two intensities of direct current of two polarities, of pulsating current of two polarities and of alternating current, means at said sending station for connecting any one of said sources to said conducting path, a transformer, a rectifier, unidirectional devices, marginal and non-marginal relays, a circuit at said receiving station including said transformer, said rectifier, said unidirectional devices and said marginal and non-marginal relays, other circuits at said receiving station including contacts on said relays, and means at said receiving station for closing a predetermined one of said other circuits depending on the particular type and intensity of current applied to said conducting path at said sending station.

6. A signalling system comprising a sending and a receiving station, a conducting path connecting said stations, sources of alternating current and of direct current of two polarities, rectifiers, resistances, a circuit at said sending station for said rectifiers and said resistances, means at said sending station for applying either alternating, direct or pulsating direct current of either polarity and intensity to said conducting path, a transformer, rectifiers, relays, a circuit at said receiving station including said transformer, said rectifier and said relays, other circuits including contacts on said relays at said receiving station, and means for closing a predetermined one of said other circuits depending on the particular type and intensity of current applied to said conducting path at said sending station.

7. A signalling system comprising a sending and a receiving station, a conducting path connected to said sending station, a transformer having a primary winding and a secondary winding, the primary winding of said transformer serially connecting said path and said receiving station, a first pair of relays serially connected, a first unidirectional device serially disposed between said path and said relays, a second pair of relays serially connected, a second unidirectional device serially disposed between said path and said second named relays, said second unidirectional device poled oppositely to said first unidirectional device, a fifth relay, a rectifier means, said means serially disposed between said fifth relay and the secondary winding of said transformer, sources of direct current and alternating current, a current reversing device for periodically reversing the polarity of said direct current, a circuit at said sending station including said reversing device, means at said sending station for connecting current of either of said sources to said path and for operating said reversing device, a plurality of contacts associated with each of said relays, a plurality of circuits associated with said receiving station to be controlled by said sending station, each of said circuits associated with different of said contacts, means for closing a predetermined one of said circuits, said means responsive to the particular type, polarity and intensity of current applied to said path at said sending station, said device for reversing the polarity of said direct current operating at a sufficiently slow rate so as not to induce a voltage in the secondary winding of said transformer.

FERNAND P. GOHOREL.

REFERENCES CITED

The following references are of record in the file of this patent:

UNITED STATES PATENTS

| Number | Name | Date |
|---|---|---|
| 1,704,736 | Geiger | Mar. 12, 1929 |
| 1,900,095 | Brownstein | Mar. 7, 1933 |
| 2,138,878 | Phinney | Dec. 6, 1938 |
| 2,141,803 | Thompson | Dec. 27, 1938 |
| 2,355,934 | Weld | Aug. 15, 1944 |
| 2,424,243 | Lowell | July 22, 1947 |

FOREIGN PATENTS

| Number | Country | Date |
|---|---|---|
| 499,900 | Great Britain | Jan. 31, 1939 |